(12) United States Patent
    Inamura

(10) Patent No.: US 10,073,311 B2
(45) Date of Patent: Sep. 11, 2018

(54) DISPLAY DEVICE AND ELECTRONIC APPARATUS

(71) Applicant: Japan Display Inc., Tokyo (JP)

(72) Inventor: Hiroshi Inamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/649,751

(22) Filed: Jul. 14, 2017

(65) Prior Publication Data

US 2017/0307945 A1   Oct. 26, 2017

Related U.S. Application Data

(63) Continuation of application No. 14/803,628, filed on Jul. 20, 2015, now Pat. No. 9,726,949.

(30) Foreign Application Priority Data

Jul. 22, 2014   (JP) .................................. 2014-149259
Jul. 14, 2015   (JP) .................................. 2015-140805

(51) Int. Cl.
    *G02F 1/1333*   (2006.01)
    *G02F 1/1343*   (2006.01)
    *G02F 1/1362*   (2006.01)
    *G02F 1/1335*   (2006.01)
    *G02F 1/1345*   (2006.01)

(52) U.S. Cl.
    CPC .. *G02F 1/136204* (2013.01); *G02F 1/133512* (2013.01); *G02F 1/1345* (2013.01); *G02F 1/134363* (2013.01); *G02F 2001/133334* (2013.01); *G02F 2201/50* (2013.01)

(58) Field of Classification Search
    CPC .................................................... G02F 1/13338
    USPC ......................................................... 349/111
    See application file for complete search history.

(56) References Cited

U.S. PATENT DOCUMENTS

| 6,271,903 | B1 | 8/2001 | Shin et al. |
| 6,587,170 | B2 | 7/2003 | Shin et al. |
| 8,310,608 | B2 | 11/2012 | Yoshida et al. |
| 2004/0174484 | A1 | 9/2004 | Matsumoto |
| 2010/0171896 | A1 | 7/2010 | Yoshida |
| 2011/0102732 | A1 | 5/2011 | Washizawa |
| 2012/0218198 | A1* | 8/2012 | Shin ...................... G06F 3/0412 345/173 |

FOREIGN PATENT DOCUMENTS

| JP | 10-206867 | 8/1998 |
| JP | 2010-107943 | 5/2010 |

* cited by examiner

*Primary Examiner* — Wen-Ying P Chen
(74) *Attorney, Agent, or Firm* — K&L Gates LLP

(57) ABSTRACT

A liquid crystal display device includes a pixel substrate, a counter substrate, and a liquid crystal layer. The pixel substrate includes a pixel electrode and a common electrode. The counter substrate has a conductive light shielding layer and faces the pixel substrate. The liquid crystal layer is sealed in between the pixel substrate and the counter substrate. The common electrode and the light shielding layer are electrically coupled to each other via a protection circuit.

8 Claims, 10 Drawing Sheets

DISPLAY DEVICE AND ELECTRONIC APPARATUS

CROSS REFERENCES TO RELATED APPLICATIONS

The present application is a continuation application of U.S. patent application Ser. No. 14/803,628, filed on Jul. 20, 2015, which application claims priority to Japanese Priority Patent Application JP 2014-149259 filed in the Japan Patent Office on Jul. 22, 2014, and JP 2015-140805 filed in the Japan Patent Office on Jul. 14, 2015, the entire content of which is hereby incorporated by reference.

BACKGROUND

1. Technical Field

The present invention relates to a liquid crystal display device and an electronic apparatus.

2. Description of the Related Art

There is a technology for a liquid crystal display device that includes a liquid crystal layer provided between a pair of substrates, in which one or more pixel electrodes and a common electrode that applies, in cooperation with the pixel electrodes, an electric field to liquid crystal in a direction along a substrate surface are provided on an opposite surface of one of the substrates so as to form a plurality of pixel areas, in which conductive black matrixes that have openings corresponding to display areas of the pixel areas and cover a non-display area other than the pixel areas are provided on an opposite surface of the other substrate, and in which the black matrixes have substantially the same potential as that of the common electrode (See Japanese Patent Application Laid-open Publication No. 10-206867 (JP-A-10-206867)).

There is another technology for a horizontal electric field type liquid crystal device that includes a first substrate including a pixel electrode and a common electrode provided on one of surfaces, a second substrate provided so as to face the one of the surfaces of the first substrate with a predetermined interval, a liquid crystal layer held between the first substrate and the second substrate, and a circular seal material arranged so as to surround the liquid crystal layer, in which the liquid crystal layer is driven by an electric field produced between the pixel electrode and the common electrode. A drive circuit and a wiring electrically coupled to the drive circuit are formed on a surface of the liquid crystal layer side of the first substrate, and an electrostatic shielding layer and an insulating layer formed of a resin material are formed on a surface of the liquid crystal layer side of the second substrate in this order, in which the wiring and the electrostatic shielding layer are electrically coupled to each other through a conductive material formed on an exposing portion in which the insulating layer is removed along the outer peripheral side of the seal material, and in which the potential of the electrostatic shielding layer is controlled to a predetermined potential by the drive circuit (See Japanese Patent Application Laid-open Publication No. 2010-107943 (JP-A-2010-107943)).

In the liquid crystal display device, display quality may be degraded because an electric charge is charged on a counter substrate under the influence caused by static electricity or moisture. In the technology disclosed in JP-A-10-206867 and the technology disclosed in JP-A-2010-107943, although the electric charge on the counter substrate can be removed, a common potential is also applied to the counter substrate at the time of driving. In the horizontal electric field type liquid crystal device, if a common potential is applied to the counter substrate at the time of driving, then a pseudo-vertical electric field is applied thereto, which may cause degradation of another display quality such as flicker or burn-in.

SUMMARY

According to an aspect, a liquid crystal display device comprising: a pixel substrate that includes a pixel electrode and a common electrode; a counter substrate that includes a conductive light shielding layer and faces the pixel substrate; and a liquid crystal layer sealed in between the pixel substrate and the counter substrate, wherein the common electrode and the light shielding layer are electrically coupled to each other via a protection circuit.

According to another aspect, an electronic apparatus comprising: a liquid crystal display device that includes: a pixel substrate that includes a pixel electrode and a common electrode; a counter substrate that includes a conductive light shielding layer and faces the pixel substrate; and a liquid crystal layer sealed in between the pixel substrate and the counter substrate, wherein the common electrode and the light shielding layer are electrically coupled to each other via a protection circuit.

Additional features and advantages are described herein, and will be apparent from the following Detailed Description and the figures.

DETAILED DESCRIPTION

Figure 1:
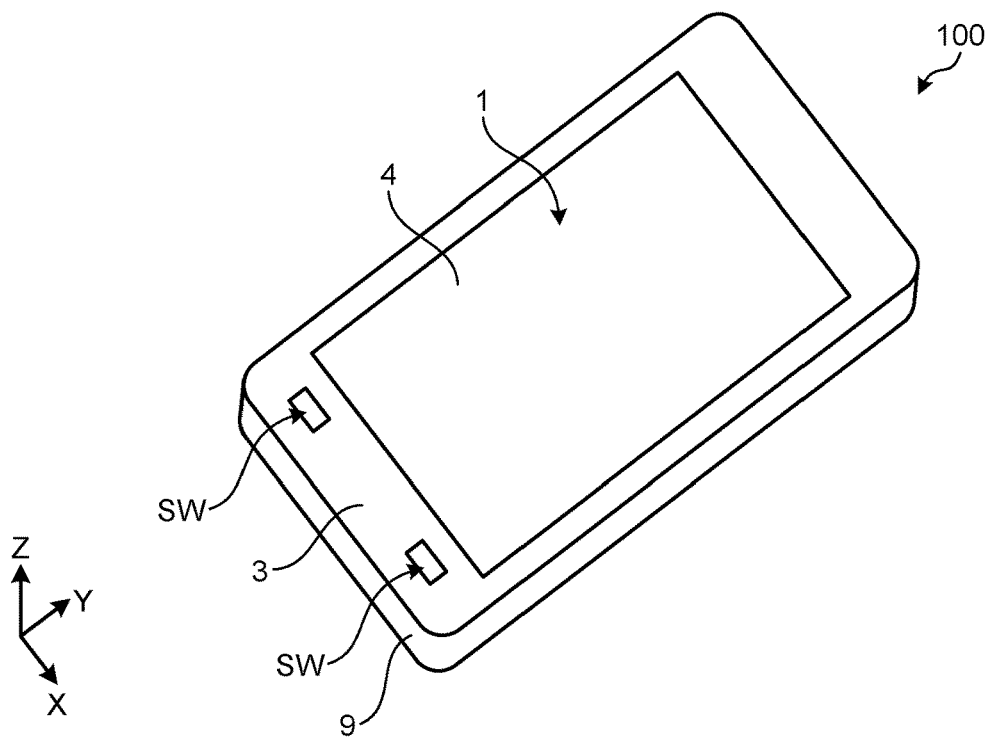
FIG. 1 is a schematic perspective view for explaining an electronic apparatus that includes a liquid crystal display device according to a present embodiment.

Exemplary embodiments for implementing the present invention will be explained in detail below with reference to the accompanying drawings. The present invention is not limited by the contents described in the following embodiments. The components described as follows include those which can be easily thought of by persons skilled in the art and those which are substantially equivalents. In addition, the components described below can be arbitrarily combined with each other. The disclosure is only an example, and therefore modifications within the gist of the invention which can be easily thought of by persons skilled in the art are obviously included in the scope of the present invention. Moreover, the widths, the thicknesses, the shapes, and the like of units in the drawings may be schematically represented as compared with those of actual aspects for the sake of clearer description. However, these representations are only examples, and therefore the interpretation of the present invention is not limited thereby. In the present specification and the figures, the same reference signs are assigned to the same elements as those in described figures, and detailed explanation may be omitted if unnecessary.

First Embodiment

FIG. 1 is a schematic perspective view for explaining an electronic apparatus that includes a liquid crystal display device according to a present embodiment. In the following, an XYZ orthogonal coordinate system is set and each relationship between units will be explained below with reference to the XYZ orthogonal coordinate system. An X-axis direction as one direction in a horizontal plane is called a width direction, a Y-axis direction as a direction orthogonal to the X-axis direction in the horizontal plane is called a vertical direction, and a Z-axis direction orthogonal to the X-axis direction and to the Y-axis direction is called a thickness direction. The X-axis is orthogonal to a YZ plane. The Y-axis is orthogonal to an XZ plane. The Z-axis is orthogonal to an XY plane. The XY plane includes the X-axis and the Y-axis. The XZ plane includes the X-axis and the Z-axis. The YX plane includes the Y-axis and the Z-axis.

As illustrated in FIG. 1, an electronic apparatus 100 includes a housing frame (housing member) 9 and a liquid crystal display device 1. The electronic apparatus 100 has a display area 4 that a viewer can check a display from the thickness direction (Z-axis direction) of the liquid crystal display device 1, and has a light shielding area 3 provided along an outer periphery of the display area 4 where light passing through the outer periphery is limited more than light passing through the display area 4. A wakeup function of the liquid crystal display device 1 or of the electronic apparatus 100 and a capacitive or mechanical switch SW having an input-output function may be arranged in part of the light shielding area 3.

Figure 2:
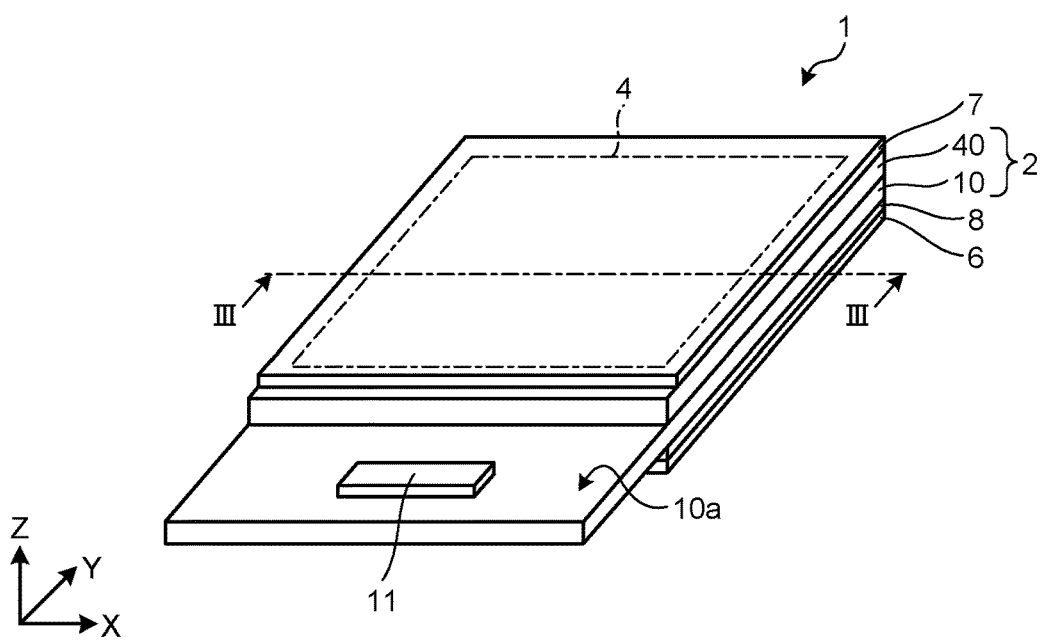
FIG. 2 is a schematic perspective view for explaining the liquid crystal display device according to the present embodiment.
Figure 3:
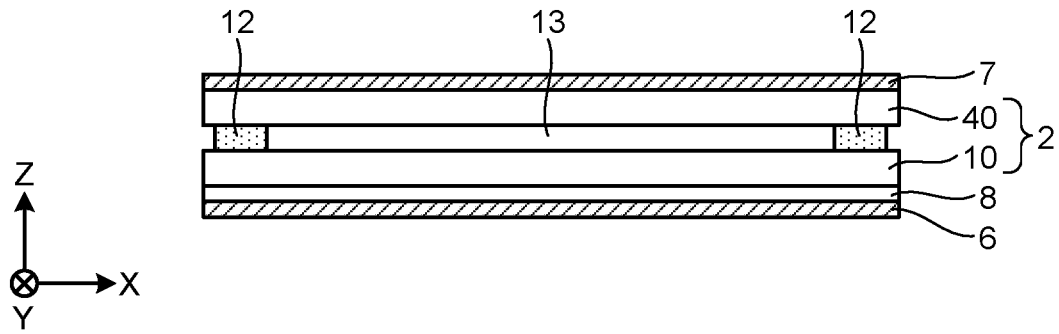
FIG. 3 is a schematic cross-sectional view for explaining an III-III cross section of FIG. 2.

FIG. 2 is a schematic perspective view for explaining the liquid crystal display device according to the present embodiment. FIG. 3 is a schematic cross-sectional view for explaining an III-III cross section of FIG. 2. As illustrated in FIG. 2, the liquid crystal display device 1 includes a display panel 2, and a polarizing plate 7 as a first polarizing plate and a polarizing plate 6 as a second polarizing plate which are arranged across the display panel 2. A phase difference film 8 is disposed between the polarizing plate 6 and the display panel 2.

As illustrated in FIG. 2, a pixel substrate 10 has a larger area than a counter substrate 40 in planar view, and is bonded to the counter substrate 40 in such a manner that a part of the pixel substrate 10 is extended from the counter substrate 40. A drive IC 11 for driving a liquid crystal layer 13 is mounted on an extended portion 10a being the extended part. The polarizing plate 6 is disposed on the pixel substrate 10 side of the display panel 2, while the polarizing plate 7 is disposed on the counter substrate 40 side of the display panel 2. Therefore, the polarizing plate 7, the display panel 2, the phase difference film 8, and the polarizing plate 6 are layered in this order. The opposite sides between the polarizing plate 7 and the display panel 2 and the opposite sides between the phase difference film 8 and the polarizing plate 6 are respectively bonded to each other via an adhesion layer.

The polarizing plate 6 illustrated in FIG. 2 includes a polarizer and a pair of protective films bonded to both planes of the polarizer and having a translucency. Likewise, the polarizing plate 7 includes a polarizer and a pair of protective films bonded to both planes of the polarizer and having a translucency. As a polarizer, those obtained by absorbing a dichroic material such as an iodine or a dichroic dye on, for example, a polyvinyl alcohol-based film and performing uniaxial drawing on the obtained film can be used. As a protective film, for example, triacetyl cellulose (TAC) is used. As the phase difference film 8, for example, a birefringent film of a high-molecular polymer film and an orientation film of a liquid crystal polymer can be used. A phase difference film may be disposed between the polarizing plate 7 illustrated in FIG. 2 and the display panel 2. The polarizing plate 6, the polarizing plate 7, the phase difference film 8, and the protective films, and the like are called an optical film, and the optical film has an area larger than the display area 4 and equal to or less than the counter substrate 40.

As illustrated in FIG. 3, the display panel 2 includes the pixel substrate 10 and the counter substrate 40, as a pair of substrates, which face each other via a frame-shaped seal member 12 and are bonded to each other. Liquid crystal is sealed in a space surrounded by the pixel substrate 10, the counter substrate 40, and the seal member 12 to form the liquid crystal layer 13. In other words, the seal member 12 is a circular member arranged so as to surround the liquid crystal layer 13 in planar view. The seal member 12 is formed with resin such as ultraviolet curing resin having insulating properties.

Figure 4:
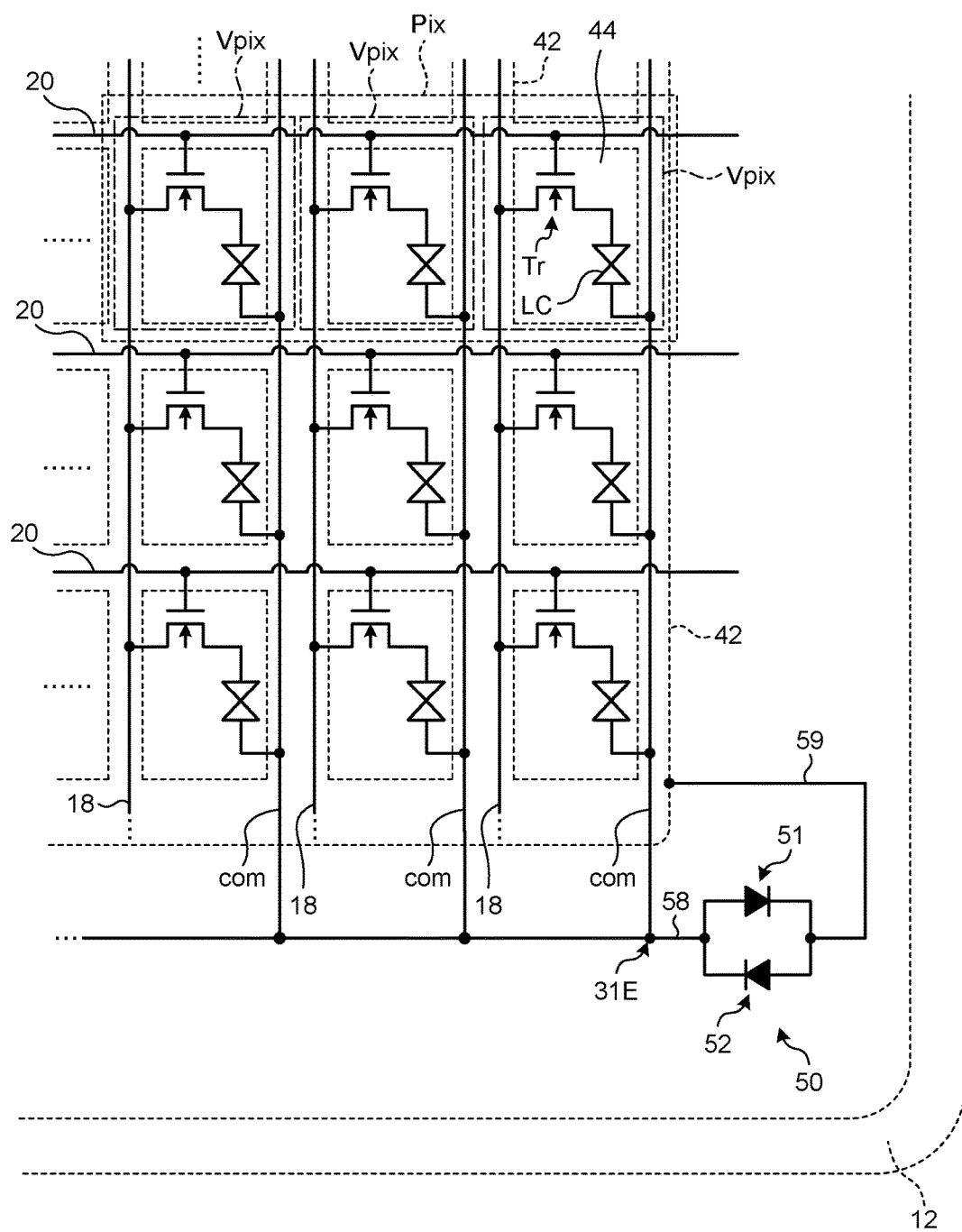
FIG. 4 is a circuit diagram of an example of a drive circuit that drives pixels according to a first embodiment.

The display panel 2 has a large number of pixels used for display arranged in a matrix in the area where the liquid crystal layer 13 is sealed. The area where the large number of pixels used for display are arranged in the matrix is the display area 4 illustrated in FIG. 1 and FIG. 2. FIG. 4 is a circuit diagram of an example of a drive circuit that drives pixels. Data lines 18 for supplying pixel signals as display data to thin film transistors (TFTs) Tr of sub-pixels Vpix illustrated in FIG. 4 are formed in the display area 4 for q+1 ($0 \leq q \leq n$) lines. Scan lines 20 for driving the TFTs Tr are formed in the display area 4 for p+1 ($0 \leq p \leq m$) lines. In this way, the data lines 18 extend on a plane parallel to the surface of the pixel substrate 10, and supply pixel signals used to display an image to the sub-pixels Vpix. The sub-pixel Vpix includes the thin film transistor Tr and a liquid crystal capacitor LC. The thin film transistor Tr is formed of an n-channel metal oxide semiconductor (MOS) TFT in this example. Either one of a source and a drain of the thin film transistor Tr is coupled to the data line 18, a gate G thereof is coupled to the scan line 20, and the other one of the source and the drain is coupled to one end of the liquid crystal capacitor LC. The liquid crystal capacitor LC is coupled at its one end to the thin film transistor Tr, and is coupled at the other end to a common potential Vcom of a common electrode com.

A sub-pixel Vpix is coupled to the other sub-pixels Vpix belonging to the same row in the display area 4 through the scan line 20. A vertical driver (not illustrated) applies a vertical scan pulse to the scan line 20 in a scan direction. A sub-pixel Vpix is coupled to the other sub-pixels Vpix belonging to the same column in the display area 4 through the data line 18. The data lines 18 are coupled to a horizontal driver (not illustrated) and are supplied with pixel signals from the horizontal driver. The common electrode com is coupled to a drive electrode driver (not illustrated). The drive electrode driver supplies a voltage (common potential Vcom) to the common electrode com. Moreover, the common electrode com supplies the common potential Vcom to a sub-pixel Vpix and also to the other sub-pixels Vpix belonging to the same column of the display area 4.

Generally, the vertical driver applies the vertical scan pulse to the gates of the thin film transistors Tr in the sub-pixels Vpix through the scan line 20 illustrated in FIG. 4 to thereby sequentially select one row (one horizontal line), as a target of display driving, from among the sub-pixels Vpix formed in the matrix in the display area 4. The horizontal driver supplies pixel signals to the sub-pixels Vpix including one horizontal line sequentially selected by the vertical driver through the respective data lines 18. In the sub-pixels Vpix, the display of one horizontal line is performed according to the supplied pixel signals. In the liquid crystal display device 1, the horizontal driver supplies pixel signals to the sub-pixels Vpix belonging to one horizontal line, so that the display is performed by one horizontal line. In the display operation, the drive electrode driver is configured to apply a common potential Vcom of the common electrode com corresponding to the one horizontal line.

Figure 5:
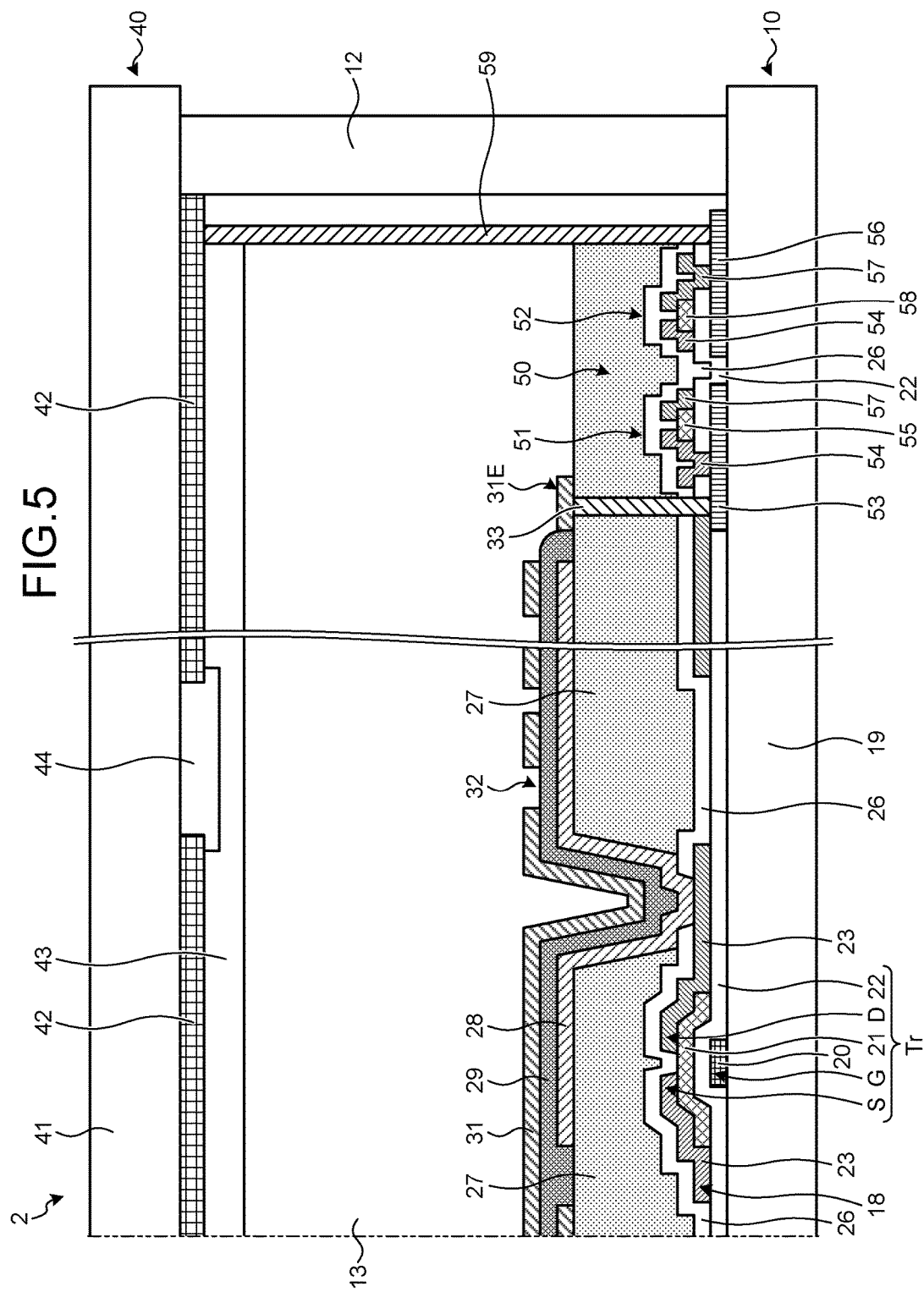
FIG. 5 is a partial cross-sectional view of a liquid crystal display device according to the first embodiment.

FIG. 5 is a partial cross-sectional view of the liquid crystal display device according to the first embodiment. The display panel 2 includes the counter substrate (upper substrate) 40 illustrated in FIG. 5, the pixel substrate (lower substrate) 10 that faces the surface of the counter substrate 40 in the vertical direction, and the liquid crystal layer 13 provided in between the counter substrate 40 and the pixel substrate 10. A backlight (lighting device) is provided on the plane of the pixel substrate 10 in the opposite side of the liquid crystal layer 13.

The liquid crystal display device 1 is a liquid crystal display device of a lateral electric field mode such as fringe field switching (FFS) or in-plane switching (IPS) in which the liquid crystal layer 13 modulates light passing therethrough according to the state of the electric field. Liquid crystal molecules are largely dispersed in the liquid crystal layer 13.

The counter substrate 40 includes a translucent substrate 41 such as glass, a color filter 44 formed on the liquid crystal layer 13 side, and a light shielding layer called black matrix having light shielding properties (hereinafter, called a black matrix) 42. An orientation film 43 is formed on the liquid crystal layer 13 side of the color filter 44. The counter substrate 40 may include a retardation plate formed on the opposite side to the liquid crystal layer 13 side of the translucent substrate 41, and a polarizing plate formed on the opposite side to the translucent substrate 41 side of the retardation plate. The color filter 44 includes color areas colored in three colors of, for example, red (R), green (G), and blue (B). The color filter 44 is configured to periodically array the color areas of the color filter 44 colored in the three colors, for example, red (R), green (G), and blue (B) in the openings illustrated in FIG. 4, and to associate the color areas in the three colors: R, G, and B grouped as a set being a pixel Pix with the sub-pixels Vpix illustrated in FIG. 4. The color filter 44 overlaps the liquid crystal layer 13 viewed from a direction perpendicular to the pixel substrate 10. The color filter 44 may be a combination of other colors if the color areas are colored in different colors. There may be any sub-pixel Vpix having an opening in which the color filter 44 is not provided, or there may be any sub-pixel Vpix having an opening in which a transparent resin layer is provided instead of the color filter 44. In the color filter 44, the luminance of the color area of green (G) is generally higher than the luminance of the color area of red (R) and of the color area of blue (B). The color filter 44 may be formed so that the black matrix 42 covers the outer periphery of each sub-pixel Vpix illustrated in FIG. 4. The black matrixes 42 are arranged on boundaries each between two-dimensionally arranged sub-pixel Vpix and sub-pixel Vpix, and a lattice shape is thereby formed as illustrated in FIG. 4. The black matrix 42 is formed of a material having conductivity and a high light absorptivity. In the embodiment, the color filter 44 and the black matrix 42 are provided on the counter substrate 40 side; however, they may be provided on the pixel substrate 10 side.

The orientation film 43 is used to orient the liquid crystal molecules in the liquid crystal layer 13 in a predetermined direction, and is in direct contact with the liquid crystal layer 13. The orientation film 43 is formed of, for example, a polymer material such as polyimide, and is formed by performing, for example, rubbing processing on applied polyimide, etc.

The pixel substrate 10 is a TFT substrate in which various circuits are formed on a translucent substrate 19, and includes a first electrode 28 being a plurality of pixel electrodes arranged in the matrix on the pixel substrate 10 and a second electrode 31 being the common electrode com illustrated in FIG. 4. As illustrated in FIG. 5, the first electrode 28 and the second electrode 31 are insulated by an insulating layer 29. The second electrode 31 overlaps the first electrode 28 viewed from a direction perpendicular to the surface of the pixel substrate 10. The first electrode 28 and the second electrode 31 are translucent electrodes formed of a translucent conductive material (translucent conductive oxide) such as indium tin oxide (ITO).

As illustrated in FIG. 4, each of the sub-pixels Vpix includes the thin film transistor Tr being a switching element. For example, the thin film transistors Tr being switching elements of the sub-pixels Vpix are formed on the translucent substrate 19 of the pixel substrate 10 illustrated in FIG. 5.

As illustrated in FIG. 5, the scan line 20 three-dimensionally intersects with part of a semiconductor layer 21 to act as the gate G of the thin film transistor Tr. There is one portion at which the scan line 20 and the part of the semiconductor layer 21 three-dimensionally intersect with each other, and the thin film transistor Tr is a single gate transistor with an n-channel region ch. The thin film transistor Tr may be a double gate transistor, or may be any functional element (switching element) if it has a switching function. The semiconductor layer 21 is formed of, for example, amorphous silicon or low temperature polysilicon. The data line 18 extends on the plane parallel to the surface of the translucent substrate 19, and supplies a pixel signal for displaying an image to pixels. The semiconductor layer 21 is electrically coupled to a source S in which a wiring 23 coupled at its portion to the data line 18 is set as the source S, and is electrically coupled to a drain D in which the wiring 23, whose the other portion is formed on the same layer as the data line 18, is set as the drain D. The drain D according to the first embodiment is electrically coupled to the second electrode 31 in a through hole. In the first embodiment, the scan line 20 is a wiring of metal such as molybdenum (Mo) and aluminum (Al), and the data line 18 is a wiring of metal such as aluminum.

An insulating layer 22 is an insulating film (first insulating film) between the scan line 20 and the semiconductor layer 21. An insulating layer 26 is an insulating film covering the wiring 23. An insulating layer 27 is called an overcoat layer which is an insulating layer to reduce a difference of level or the like caused by formation of the thin film transistor Tr. The insulating layer 29 is an insulating film (second insulating film) between the first electrode 28 and the second electrode 31. More specifically, each portion of the insulating layer 22 is layered on a location (layer) on the translucent substrate 19 and/or on the scan line 20. The insulating layer 22, the insulating layer 26, and the insulating layer 29 according to the first embodiment are an inorganic insulating layer of silicon nitride (SiNx) or silicon oxide. The insulating layer 27 is formed of an organic insulating material such as a polyimide resin. The materials for forming the layers of the insulating layer 22, the insulating layer 26, the insulating layer 27, and the insulating layer 29 are not limited thereto. The insulating layers 22 and 26 may be formed of the same insulating material, or either one of them may be formed of a different insulating material. An orientation film (not illustrated) is provided along the liquid crystal layer 13 side of the second electrode 31. The orientation film is used to orient the liquid crystal molecules in the liquid crystal layer 13 in a predetermined direction, and is in direct contact with the liquid crystal layer 13. The orientation film is formed of, for example, a polymer material such as polyimide, and is formed by performing, for example, rubbing processing on applied polyimide, etc.

The pixel substrate 10 has slit openings 32 made in the second electrode 31 corresponding to the sub-pixels Vpix. The liquid crystal display device 1 drives the liquid crystal layer 13 by an electric field (fringe electric field) leaked from the slit openings of the second electrode 31, of the electric field formed between the second electrode 31 and the first electrode 28.

The liquid crystal display device 1 includes a protection circuit 50 and a columnar first conductive member 59 provided in part of the outer periphery of the display area 4. The first conductive member 59 is formed of a conductive material in which conductive paste and conductive beads are mixed in an insulating resin. The conductive paste and the conductive beads are materials having conductivity exemplified by conductive metal or graphite. By using the same material as that of the seal member 12 for the conductive resin as part of the first conductive member 59, the formation of the first conductive member 59 is facilitated. The first conductive member 59 may be formed of a conductive metal material, or may be a laminate of a different conductive metal material. The first conductive member 59 may also be a laminate of a translucent conductive material and a metal material.

The first conductive member 59 is a wiring that is disposed between the pixel substrate 10 and the counter substrate 40. The first conductive member 59 electrically couples the black matrix 42 and the protection circuit 50. The protection circuit 50 is electrically coupled at one end to a coupling portion 31E of the second electrode 31 being the common electrode via and is electrically coupled at the other end to the first conductive member 59. The second conductive member 33 is formed of the conductive material which is a translucent conductive material (translucent conductive oxide) or the like such as ITO. By forming the second conductive member 33 with the same material as that of the second electrode 31, an increase in processes can be reduced. The second conductive member 33 may be formed of a conductive metal material, or may be a laminate of different conductive metal materials. The second conductive member 33 may also be a laminate of a translucent conductive material and a metal material. The second conductive member 33 may be formed of a conductive material or so in which conductive paste and conductive beads are mixed in an insulating resin.

Figure 6:
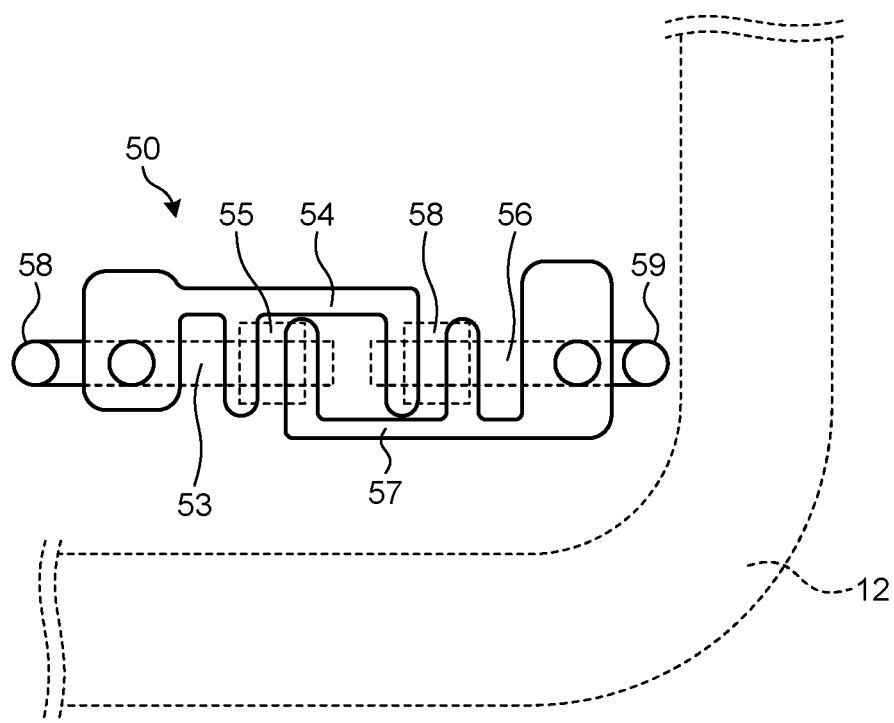
FIG. 6 is a plan view of a protection circuit of the display device according to the first embodiment when viewed from the top.

FIG. 6 is a plan view of the protection circuit of the display device according to the first embodiment when viewed from the top. As illustrated in FIG. 5 and FIG. 6, in the protection circuit 50, two diodes 51 and 52 having a predetermined voltage threshold are combined through coupling illustrated in FIG. 4, to form a nonlinear element which is called a short ring (ring diode). As illustrated in FIG. 6, an example in which the protection circuit 50 is disposed in a corner area inside the seal member 12 will be explained. The area where the protection circuit 50 is disposed is not limited to the corner area inside the seal member 12. The liquid crystal display device 1 may include a plurality of protection circuits 50, which may be disposed, for example, in all of four corners.

The diode 51 includes a first lower wiring layer 53, a first upper wiring layer 54, a second upper wiring layer 57, and a semiconductor layer 55. The diode 52 includes a second lower wiring layer 56, a first upper wiring layer 54, a second upper wiring layer 57, and a semiconductor layer 58. The first lower wiring layer 53 and the second lower wiring layer 56 are formed of the conductive material the same as that of the scan line 20. The first upper wiring layer 54 and the second upper wiring layer 57 are formed of the conductive material the same as that of the data line 18, the source S, or the drain D. The semiconductor layer 55 and the semiconductor layer 58 are formed of the conductive material the same as that of the semiconductor layer 21. The first lower wiring layer 53 and the second lower wiring layer 56 are separated from each other by the insulating layer 22. The first lower wiring layer 53 is electrically coupled to the semiconductor layer 58. The second lower wiring layer 56 is electrically coupled to the first conductive member 59.

As illustrated in FIG. 5 and FIG. 6, the first upper wiring layer 54 is coupled to respective portions of the semiconductor layer 55 and the semiconductor layer 58, and is electrically coupled to the first lower wiring layer 53. Likewise, the second upper wiring layer 57 is coupled to respective portions of the semiconductor layer 55 and the semiconductor layer 58, and is electrically coupled to the second lower wiring layer 56. As illustrated in FIG. 5 and FIG. 6, the semiconductor layer 55 is layered on the first lower wiring layer 53 via the insulating layer 22. Likewise, the semiconductor layer 58 is layered on the second lower wiring layer 56 via the insulating layer 22.

With the above structure, the protection circuit 50 can be simultaneously formed in a manufacturing process of the thin film transistor Tr. In the protection circuit 50, the diode 51 and the diode 52 act as a nonlinear element through which a current flows at a voltage of a predetermined threshold or higher.

As explained above, the liquid crystal display device 1 includes the pixel substrate 10 including the first electrode 28 as a pixel electrode and the second electrode 31 as a common electrode, the counter substrate 40 including the conductive black matrix 42 and facing the pixel substrate 10, and the liquid crystal layer 13 sealed in between the pixel substrate 10 and the counter substrate 40. The second electrode 31 as the common electrode and the conductive black matrix 42 are electrically coupled to each other via the protection circuit 50. The material of the black matrix 42 is, for example, resin containing chrome (Cr) or nickel (Ni), or graphite. When the material of the black matrix 42 has conductivity, there are advantages that an electric charge such as static electricity can be quickly removed.

The second electrode 31 is fixed to the common potential Vcom, and therefore the potential of the second conductive member 33 is the common potential Vcom. On the other hand, the potential of the black matrix 42 is a floating potential which is not fixed thereto, an electric charge may be charged on the counter substrate 40 under the influence caused by static electricity or moisture. When the electric charge may be charged on the counter substrate 40 under the influence caused by static electricity or moisture, a voltage between the first conductive member 59 and the second conductive member 33 reaches a predetermined threshold or higher. In the protection circuit 50, when the voltage between the first conductive member 59 and the second conductive member 33 reaches the predetermined threshold or higher, the diode 51 and the diode 52 pass a current with predetermined resistance to the first conductive member 59 and the second conductive member 33, and the potential of the black matrix 42 can be made closer to the common potential Vcom. As a result, the possibility that the liquid crystal layer 13 is affected by the potential of the black matrix 42 is suppressed, and abnormal display such as display unevenness is suppressed, thus improving display quality.

In the protection circuit 50, when the diode 51 and the diode 52 pass a current with predetermined resistance to the first conductive member 59 and the second conductive member 33, the voltage between the first conductive member 59 and the second conductive member 33 becomes low, and becomes below the threshold. Consequently, the protection circuit 50 couples the first conductive member 59 and the second conductive member 33 with high resistance, and the potential of the black matrix 42 becomes a floating potential independent from the common potential Vcom. Even when the liquid crystal display device 1 is driven, the influence of the electric field exerted on the liquid crystal layer 13 by the black matrix 42 of the counter substrate 40 is reduced, and the possibility of degradation of another display quality such as flicker or burn-in can be reduced.

Second Embodiment

Figure 7:
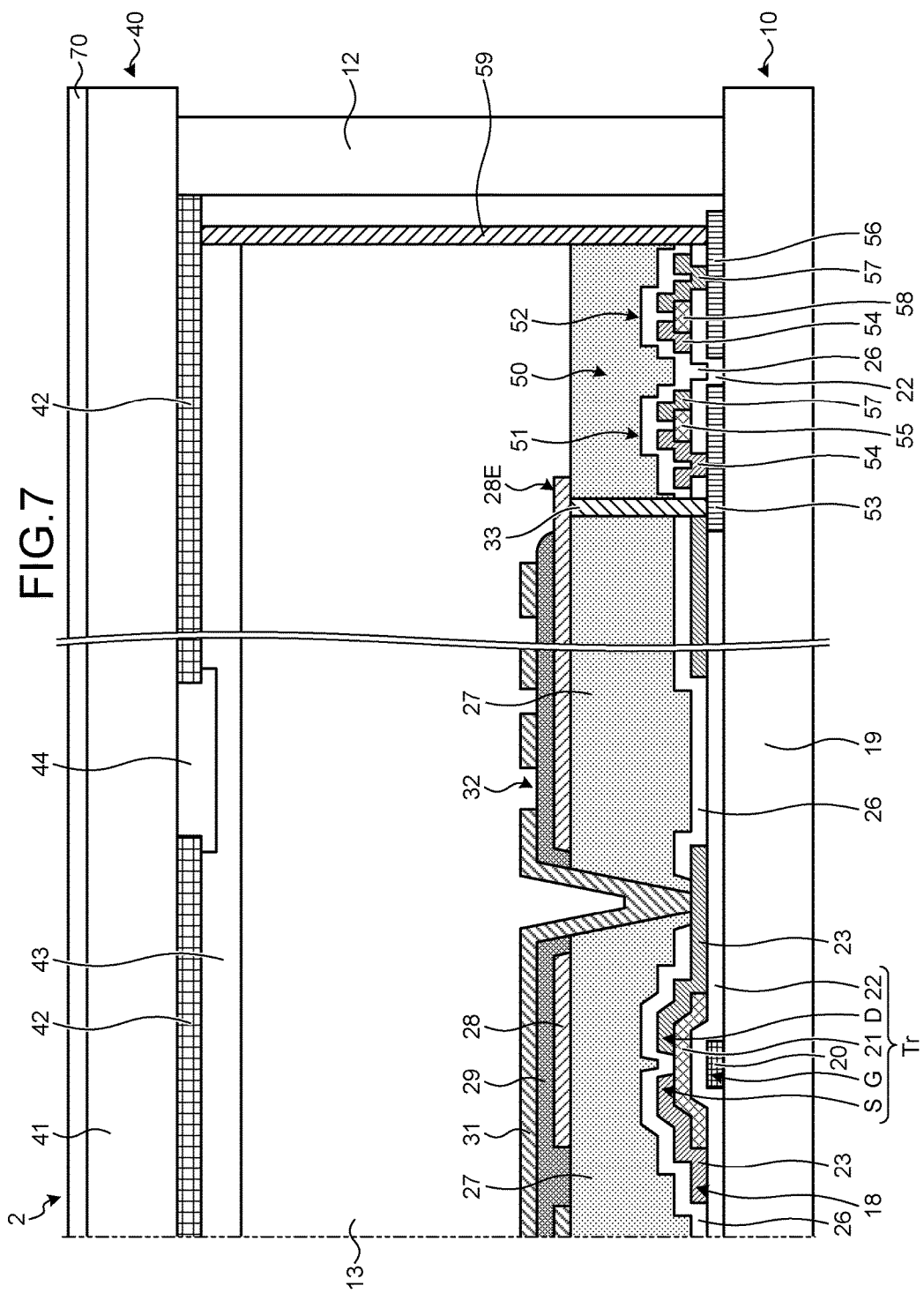
FIG. 7 is a partial cross-sectional view of a liquid crystal display device according to a second embodiment.
Figure 8:
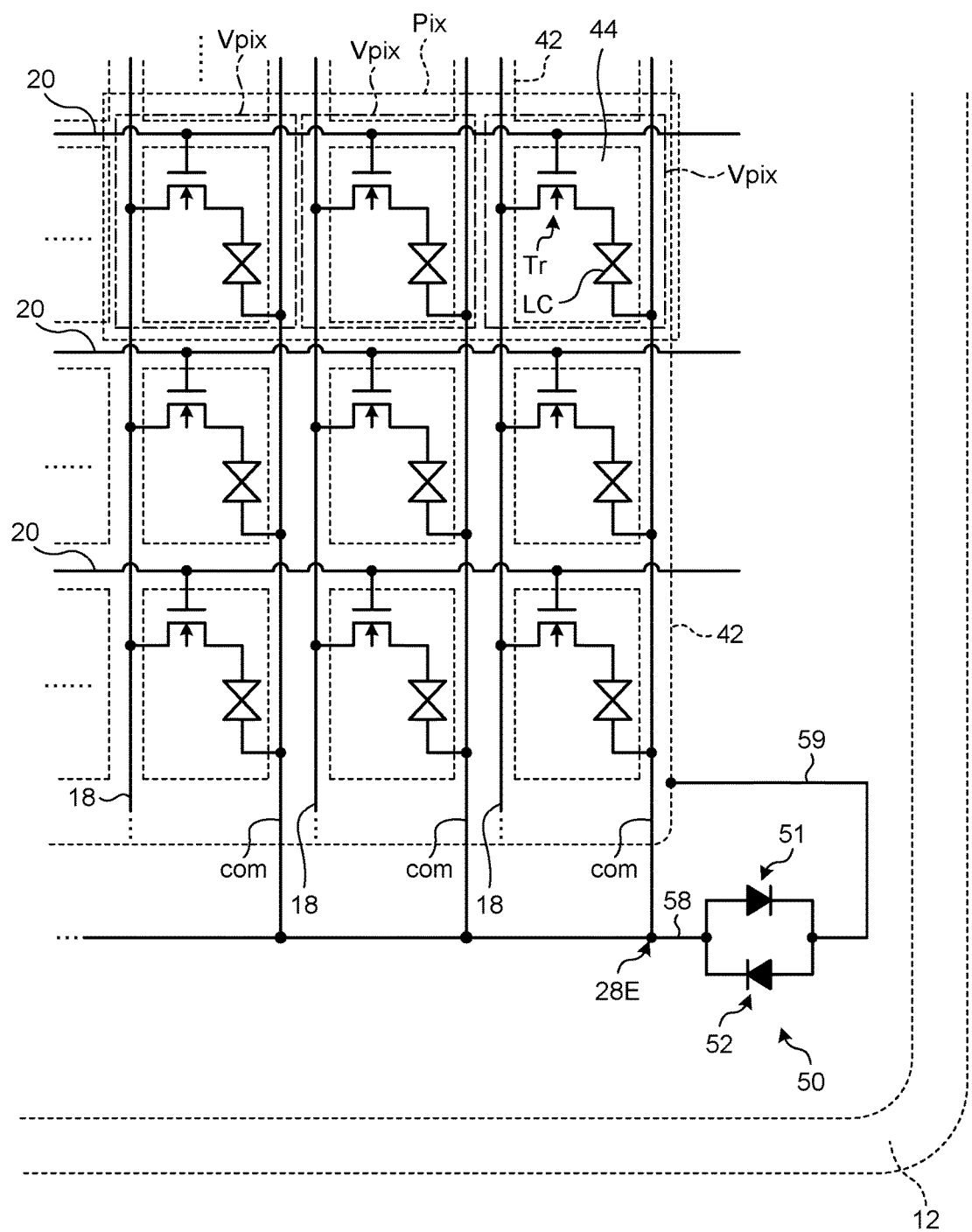
FIG. 8 is a circuit diagram of an example of a drive circuit that drives pixels according to the second embodiment.

The liquid crystal display device 1 according to a second embodiment will be explained below. FIG. 7 is a partial cross-sectional view of the liquid crystal display device according to the second embodiment. FIG. 8 is a circuit diagram of an example of a drive circuit that drives pixels according to the second embodiment. The same reference signs are assigned to the same components as these explained in the first embodiment, and overlapping explanation may be omitted.

In the pixel substrate 10 according to the first embodiment, the pixel electrode is the first electrode 28, and the common electrode is the second electrode 31. However, in the pixel substrate 10 according to the second embodiment, the pixel electrode is the second electrode 31, and the common electrode is the first electrode 28. As illustrated in FIG. 7 and FIG. 8, the protection circuit 50 is electrically coupled at one end to a coupling portion 28E of the first electrode 28 being the common electrode via the second conductive member 33, and is electrically coupled at the other end to the first conductive member 59.

The liquid crystal display device 1 according to the second embodiment includes the pixel substrate 10 including the second electrode 31 as a pixel electrode and the first electrode 28 as a common electrode, the counter substrate 40 including the conductive black matrix 42 and facing the pixel substrate 10, and the liquid crystal layer 13 sealed in between the pixel substrate 10 and the counter substrate 40. The first electrode 28 as the common electrode and the conductive black matrix 42 are electrically coupled to each other via the protection circuit 50.

Because the second electrode 31 is fixed to the common potential Vcom, the potential of the second conductive member 33 is the common potential Vcom.

The counter substrate 40 according to the second embodiment includes a conductive electrostatic shielding layer 70 to shield external noise using a translucent conductive material such as ITO. It does not matter where the electrostatic shielding layer 70 is layered if it is insulated from the black matrix 42 and is provided on a different layer. If the black matrix 42 is conductive, then a capacitance occurs because the potential of the electrostatic shielding layer 70 is independent from that of the black matrix 42, and an electric charge is easily charged between the electrostatic shielding layer 70 and the black matrix 42. When an electric charge is charged between the electrostatic shielding layer 70 and the black matrix 42, the voltage between the first conductive member 59 and the second conductive member 33 reaches the predetermined threshold or higher. In the protection circuit 50, when the voltage between the first conductive member 59 and the second conductive member 33 reaches the predetermined threshold or higher, the diode 51 and the diode 52 pass a current with predetermined resistance to the first conductive member 59 and the second conductive member 33, and the potential of the black matrix 42 can be made closer to the common potential Vcom. As a result, the possibility that the liquid crystal layer 13 is affected by the potential of the black matrix 42 is suppressed, and abnormal display such as display unevenness is suppressed, thus improving display quality.

In the protection circuit 50, when the diode 51 and the diode 52 pass a current with predetermined resistance to the first conductive member 59 and the second conductive member 33, the voltage between the first conductive member 59 and the second conductive member 33 becomes low, and becomes below the threshold. Consequently, the protection circuit 50 couples the first conductive member 59 and the second conductive member 33 with high resistance, and the potential of the black matrix 42 becomes a floating potential independent from the common potential Vcom. Even when the liquid crystal display device 1 is driven, the influence of the electric field exerted on the liquid crystal layer 13 by the black matrix 42 of the counter substrate 40 is reduced, and the possibility of degradation of another display quality such as flicker or burn-in can be reduced.

Figure 9:
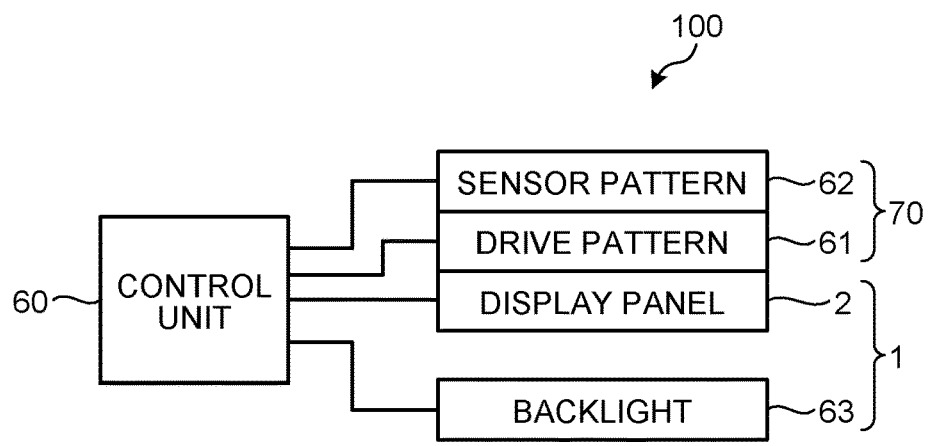
FIG. 9 is a functional block diagram of a liquid crystal display device according to a modification of the second embodiment.

FIG. 9 is a functional block diagram of a liquid crystal display device according to a modification of the second embodiment. The liquid crystal display device 1 according to the present embodiment is a touch panel in which the conductive electrostatic shielding layer 70 detects an external proximity object based on a change in capacitance and includes a drive pattern 61 and a sensor pattern 62. A control unit 60 can transmit a predetermined signal to a predetermined number of drive patterns and drive them. The sensor pattern 62 includes a plurality of stripe-shaped electrode patterns extending in a direction intersecting with an extending direction of the drive pattern 61, and sends a change in capacitance of the intersection that intersects with the drive patterns 61 to the control unit 60. The control unit 60 can detect an external proximity object based on the change in capacitance obtained from the sensor pattern 62. The control unit 60 can also control the display panel and a backlight (lighting device) 63 according to a video.

The electrostatic shielding layer 70 illustrated in FIG. 7 includes at least one of the drive pattern 61 and the sensor pattern 62, and therefore a capacitance may occur because the potential of the drive pattern 61 or of the sensor pattern 62 and the potential of the black matrix 42 are independent from each other. Electric charge is charged between the drive pattern 61 or the sensor pattern 62 and the black matrix 42, so that the voltage between the first conductive member 59 and the second conductive member 33 may reach the predetermined threshold or higher. In the protection circuit 50, when the voltage between the first conductive member 59 and the second conductive member 33 reaches the predetermined threshold or higher, the diode 51 and the diode 52 pass a current with predetermined resistance to the first conductive member 59 and the second conductive member 33, and the potential of the black matrix 42 can be made closer to the common potential Vcom. As a result, the possibility that the liquid crystal layer 13 is affected by the potential of the black matrix 42 is suppressed, and abnormal display such as display unevenness is suppressed, thus improving display quality.

In the protection circuit 50, when the diode 51 and the diode 52 pass a current with predetermined resistance to the first conductive member 59 and the second conductive member 33, the voltage between the first conductive member 59 and the second conductive member 33 becomes low, and becomes below the threshold. Consequently, the protection circuit 50 couples the first conductive member 59 and the second conductive member 33 with high resistance, and the potential of the black matrix 42 becomes a floating potential independent from the common potential Vcom. Even when the liquid crystal display device 1 is driven, the influence of the electric field exerted on the liquid crystal layer 13 by the black matrix 42 of the counter substrate 40 is reduced, and the possibility of degradation of another display quality such as flicker or burn-in can be reduced.

Third Embodiment

Figure 10:
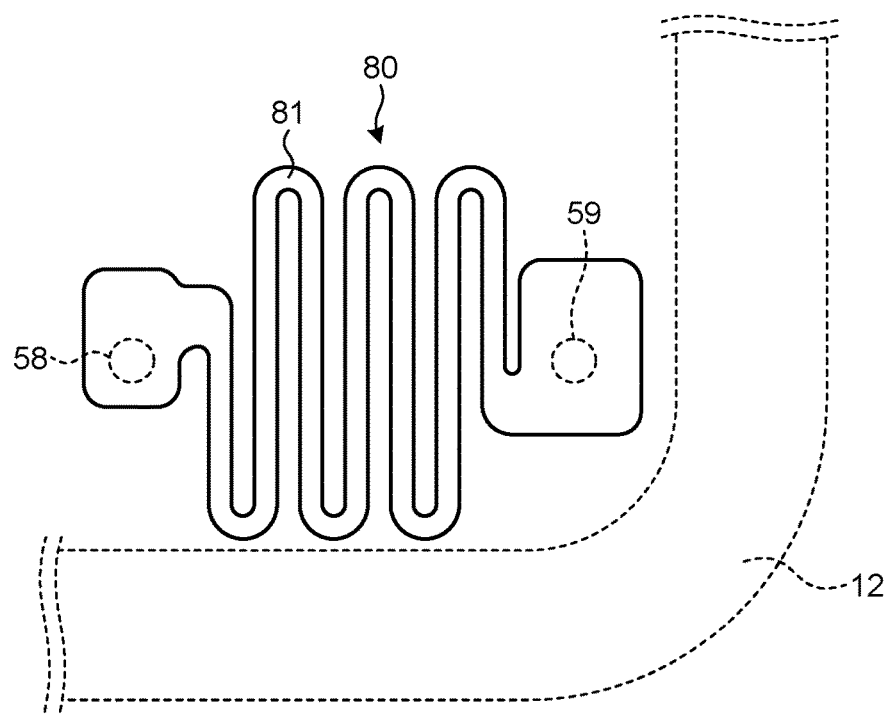
FIG. 10 is a plan view of a protection circuit of a display device according to a third embodiment when viewed from the top.
Figure 11:
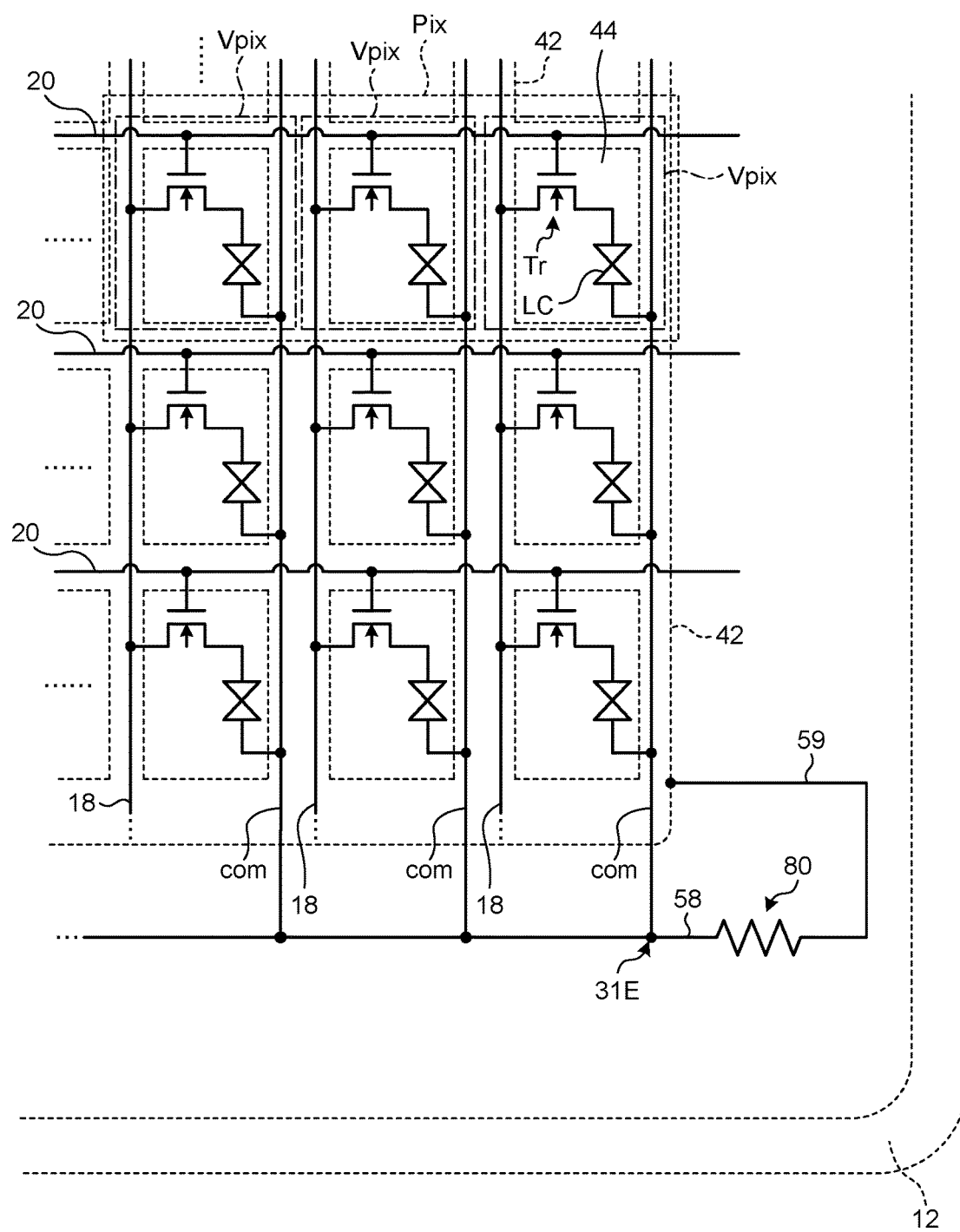
FIG. 11 is a circuit diagram of an example of a drive circuit that drives pixels according to the third embodiment.

The liquid crystal display device 1 according to a third embodiment will be explained below. FIG. 10 is a plan view of a protection circuit of a display device according to the third embodiment when viewed from the top. FIG. 11 is a circuit diagram of an example of a drive circuit that drives pixels according to the third embodiment. The same reference signs are assigned to the same components as these explained in the first or the second embodiment, and overlapping explanation is omitted.

As illustrated in FIG. 10, a protection circuit 80 is a resistive element 81 having a higher resistance than the material of the black matrix 42. The resistance of the black matrix 42 is 1Ω to 100 MΩ. The resistance of the resistive element 81 is 10 times to 10000 times of the resistance of the black matrix 42. Alternatively, the resistance of the resistive element 81 is preferably 10 MΩ to 1000 MΩ. As illustrated in FIG. 11, the resistive element 81 couples the common electrode com and the black matrix 42 with high resistance. The common electrode com illustrated in FIG. 11 is the second electrode 31, and the protection circuit 50 is electrically coupled at one end to the coupling portion 31E of the second electrode 31 being the common electrode via the second conductive member 33 formed of the conductive material, and is electrically coupled at the other end to the first conductive member 59. The common electrode com may be the first electrode 28 as explained in the first embodiment. The common electrode com may be the second electrode 31 as explained in the second embodiment.

With this structure, when the electric charge is charged on the counter substrate 40 under the influence caused by static electricity or moisture, the voltage between the first conductive member 59 and the second conductive member 33 reaches the predetermined threshold or higher. The resistive element 81 can slowly move the electric charge between the first conductive member 59 and the second conductive member 33 although it has a high resistance. Therefore, the protection circuit 80 passes a current with predetermined resistance to the first conductive member 59 and the second conductive member 33, so that the potential of the black matrix 42 can be made closer to the common potential Vcom. As a result, the possibility that the liquid crystal layer 13 is affected by the potential of the black matrix 42 is suppressed, and abnormal display such as display unevenness is suppressed, thus improving display quality.

The protection circuit 80 couples the first conductive member 59 and the second conductive member 33 with high resistance, and the potential of the black matrix 42 becomes a potential independent from the common potential Vcom at the time of driving. Even when the liquid crystal display device 1 is driven, the influence of the electric field exerted on the liquid crystal layer 13 by the black matrix 42 of the counter substrate 40 is reduced, and the possibility of degradation of another display quality such as flicker or burn-in can be reduced.

Application Example

Figure 12:
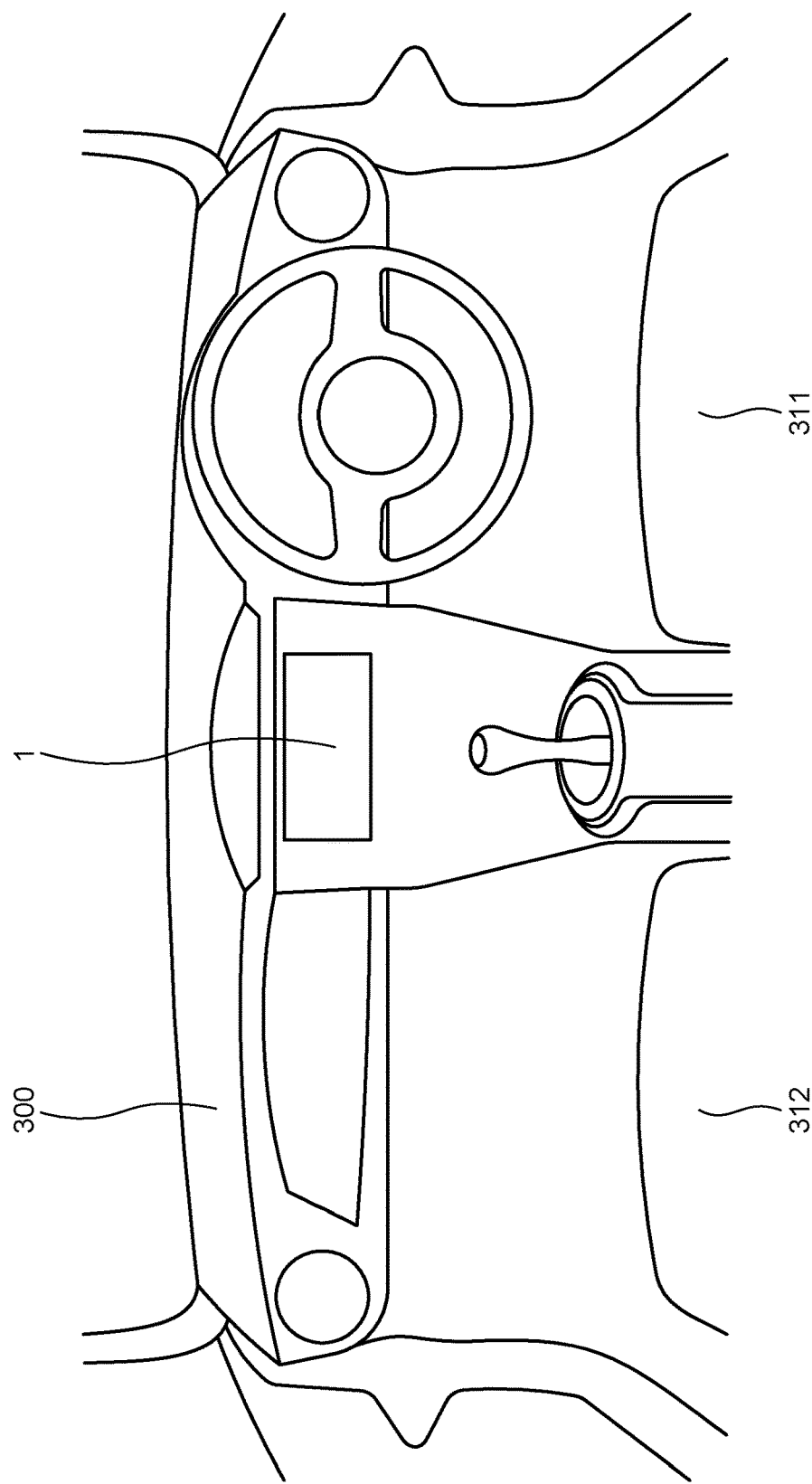
FIG. 12 is a diagram of an example of an electronic apparatus to which the liquid crystal display device according to the first to the third embodiments is applied.

FIG. 12 is a diagram of an example of an electronic apparatus to which the liquid crystal display device according to the first to the third embodiments is applied. The liquid crystal display device 1 can be applied to electronic apparatuses in all areas such as a car navigation system illustrated in FIG. 12, television devices, digital cameras, notebook personal computers, portable electronic apparatuses such as a mobile telephone illustrated in FIG. 1, or video cameras. In other words, the liquid crystal display device 1 can be applied to electronic apparatuses in all areas that display an externally input video signal or an internally generated video signal as an image or a video. The electronic apparatus includes the control unit 60 (see FIG. 9) that supplies a video signal to the liquid crystal display device 1 and controls the operation of the liquid crystal display device 1.

The electronic apparatus illustrated in FIG. 12 is the car navigation device to which the liquid crystal display device 1 according to the first and the third embodiments is applied. The liquid crystal display device 1 is installed in a dashboard 300 inside a vehicle. Specifically, it is installed in between a driver's seat 311 and a passenger's seat 312 in the dashboard 300. The liquid crystal display device 1 of the car navigation device is used for display of navigation, display of a music operation screen, or display of movie reproduction, and the like.

The embodiments are not limited by the contents described above. In addition, the components of the embodiments include those which can be easily thought of by persons skilled in the art, those which are substantially equivalent, and those in a scope of so-called equivalents.

Moreover, the components can be omitted, replaced, and modified in various ways within a scope that does not depart from the gist of the embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
   a pixel substrate including a pixel electrode and a common electrode;
   a counter substrate facing the pixel substrate;
   a seal member bonding the pixel substrate and the counter substrate to each other;
   a liquid crystal layer sealed with the seal member, and driven by an electric field generated between the pixel electrode and the common electrode;
   a conductive light shielding layer formed on the counter substrate on the liquid crystal layer side;
   a wiring layer formed on the pixel substrate;
   a conductive member electrically coupling the conductive light shielding layer and the wiring layer to each other; and
   a translucent conductive layer formed on the counter substrate on the opposite side of the liquid crystal layer side,
   wherein a potential of the conductive light shielding layer is a floating potential independent of that of the common electrode.

2. The liquid crystal display device according to claim 1, wherein
   the conductive member is formed of conductive beads and a same resin as that of the seal member.

3. The liquid crystal display device according to claim 1, wherein
   a potential of the conductive light shielding layer becomes substantially equal to that of the common electrode.

4. The liquid crystal display device according to claim 1, wherein
   the translucent conductive layer is a conductive electrostatic shielding layer configured to shield external noise.

5. A liquid crystal display device comprising:
   a pixel substrate including a pixel electrode and a common electrode;
   a counter substrate facing the pixel substrate;
   a seal member bonding the pixel substrate and the counter substrate to each other;
   a liquid crystal layer sealed with the seal member, and driven by an electric field generated between the pixel electrode and the common electrode;
   a conductive light shielding layer formed on the counter substrate on the liquid crystal layer side;
   a wiring layer formed on the pixel substrate;
   a conductive member electrically coupling the conductive light shielding layer and the wiring layer to each other; and
   a sensor pattern that is included in a translucent conductive layer formed on the counter substrate on the opposite side of the liquid crystal layer side, and that is configured to detect an external proximity object based on a change in capacitance,
   wherein a potential of the conductive light shielding layer is a floating potential independent of that of the common electrode.

6. The liquid crystal display device according to claim 5, wherein
   the conductive member is formed of conductive beads and a same resin as that of the seal member.

7. The liquid crystal display device according to claim 5, wherein
   a potential of the conductive light shielding layer becomes substantially equal to that of the common electrode.

8. The liquid crystal display device according to claim 5, further comprising a drive pattern included in the translucent conductive layer.

* * * * *